United States Patent
Ding

(10) Patent No.: US 8,300,574 B2
(45) Date of Patent: Oct. 30, 2012

(54) METHOD OF UPLINK SYNCHRONIZATION ESTABLISHMENT BASED ON THE UNITED TRANSMISSION TECHNOLOGY

(75) Inventor: Meiling Ding, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 757 days.

(21) Appl. No.: 11/916,482

(22) PCT Filed: Jul. 6, 2005

(86) PCT No.: PCT/CN2005/000989
§ 371 (c)(1),
(2), (4) Date: Aug. 4, 2009

(87) PCT Pub. No.: WO2007/003071
PCT Pub. Date: Jan. 11, 2007

(65) Prior Publication Data
US 2009/0303889 A1    Dec. 10, 2009

(51) Int. Cl.
*H04B 7/212* (2006.01)
*H04B 1/00* (2006.01)
*H04J 3/06* (2006.01)
*H04J 11/00* (2006.01)

(52) U.S. Cl. ......... 370/324; 370/350; 370/203; 375/131

(58) Field of Classification Search .................. 370/203, 370/320, 321, 324, 335, 336, 337, 342, 350, 370/436, 441, 442, 479; 375/131, 138
See application file for complete search history.

(56) References Cited

U.S. PATENT DOCUMENTS

| | | | |
|---|---|---|---|
| 2004/0052236 A1* | 3/2004 | Hwang et al. | 370/342 |
| 2004/0136316 A1* | 7/2004 | Kwak et al. | 370/208 |
| 2004/0202233 A1* | 10/2004 | Kim et al. | 375/148 |
| 2005/0175074 A1* | 8/2005 | Pan et al. | 375/148 |
| 2006/0058051 A1 | 3/2006 | Takano et al. | |
| 2006/0258383 A1 | 11/2006 | Jiang et al. | |
| 2007/0165620 A1* | 7/2007 | Li et al. | 370/376 |

FOREIGN PATENT DOCUMENTS

| | | |
|---|---|---|
| CN | 1182990 A | 5/1998 |
| CN | 1549612 A | 11/2004 |
| WO | 03/007520 A1 | 1/2003 |
| WO | 2004/093476 A1 | 10/2004 |

OTHER PUBLICATIONS

International Search Report, International Application No. PCT/CN2005/000989 (published as WO 2007/003071) (Apr. 2006).

* cited by examiner

*Primary Examiner* — Ricky Ngo
*Assistant Examiner* — Paul H Masur
(74) *Attorney, Agent, or Firm* — Arnold & Porter LLP

(57) ABSTRACT

An establishment method of uplink synchronization based on the joint transmission technology utilizes channel symmetry and channel time correlation of the downlink and the uplink in TDD mobile communication system, and then applies the joint transmission technology in the uplink synchronization establishment process in a TDD mobile communication system, and based on the simple processing performed by UE, the base station can accurately detect the timing of uplink signals by performing related calculations. The present invention has fundamentally solved the problem of low probability of success in uplink synchronization establishment.

12 Claims, 2 Drawing Sheets

METHOD OF UPLINK SYNCHRONIZATION ESTABLISHMENT BASED ON THE UNITED TRANSMISSION TECHNOLOGY

CROSS-REFERENCE TO RELATED APPLICATIONS

This application is a national phase application under 35 U.S.C. §371 of International Application No. PCT/CN2005/000989, filed Jul. 6, 2005, which is hereby incorporated by reference in its entirety.

TECHNICAL FIELD

The present invention pertains to the mobile communication systems in TDD (Time Division Duplex) and FDD (Frequency Division Duplex), especially to the establishment method of uplink synchronization in these communication systems.

TECHNOLOGY BACKGROUND

Regarding communication system, the basis for accurate information analysis is that the receiver obtains the timing information of received signals. In a mobile communication system in FDD, both uplink and downlink can be asynchronous. The base station and the user employ path searching and tracking in order to obtain timing information of the signals sent out by the other side, especially the timing information of the first path of received signals. Concerning the channel characteristics of a mobile communication system, the location of the first path of received signals will not change significantly within a short time period, however, the signal strength of the path itself is very likely to change greatly within a short time period, therefore, the path searching and tracking employ a method of performing long-term weighted average for signal energy and then using the resultant information for processing. On the other hand, the searching window of the path can be very large in a FDD mobile communication system. For example, the length of searching window of a path in a WCDMA system can be of more than 96 chips, thereby, the estimation error within a short time period will not greatly affect the subsequent performances of the system.

CDMA systems based on TDD all employ special pilot code structure. Its constructing method is to make the channel estimation values with different Midamble (the training sequence portion in the time slot burst structure) shifts in the same time slot be located in different windows for the same channel estimation result, moreover, the window width is comparable to the largest time delay of the path. For example, the length of common channel estimation window in TD-SCDMA system is of 16 chips, while the largest delay of path that can be of more than 15.3 chips. This requires that the received signals of any side in the system possess the characteristics of synchronization or quasi-synchronization, and in particular, the base station must know the starting location of user equipment (UE) transmission signals and track it, and inform UE to perform timing adjustment to achieve the goal of synchronization or quasi-synchronization.

In a TDD mobile communication system, the downlink signal is transmitted synchronously, therefore as for the UE, it can use physical channel (e.g. DwPCH and P-CCPCH) that always possesses signal transmission to perform synchronous searching and tracking; however, in the uplink direction, in order to meet the goal of synchronization or quasi-synchronization, the system needs to execute two steps of initial synchronization establishment and synchronization control, wherein, the former one is the basis for the latter and it is also the premise for realizing the system function.

Regarding to the synchronous TD-SCDMA system and quasi-synchronous TD-CDMA system of the uplink, the synchronization process has a slight difference for uplink initial signals, but every base station chooses the receiving timing of uplink initial signals as the basis for processing. However, the channel delay expanding characteristics causes an inherent error of the base station in determining the initial signal timing, and thereby affects the realization of the system function.

Taking the TD-SCDMA system whose sub-frame is shown in FIG. 1 as an example, a Chinese patent titled as "A building and maintaining method of SCDMA communication link" with patent application number of 97118934.X discloses an establishment method of uplink synchronization, as shown in FIG. 2, wherein it comprises following steps: step 21, UE estimates the distance between itself and the base station; step 22, UE determines the transmission timing based on the estimated distance; step 23, UE transmits signals; step 24, the base station obtains the location of the first path of the received signals; step 25, the network instructs UE to adjust the transmission timing; step 26, UE adjusts transmission timing.

According to this method, the base station can use the tail path of the received UpPTS (uplink pilot time slot) as the initial timing for receiving UpPTS, leading to the misreading of user timing information, which will significantly have an impact on the users under channel conditions with a large time delay expansion, and will even lead to the result that the users can not complete the accessing process. Therefore, improving the uplink synchronization establishment process of TDD mobile communication system that includes TD-SCDMA and TD-CDMA will greatly motivate the development and maturity of related systems.

Meanwhile, the application of joint detection technology has already been proved in both theory and practice. Professor P. W. Baier of Kaiserslautern University in Germany further comes up with the idea of joint transmission technology corresponding to the joint detection technology. This new technology works as follows: in TDD system, when the time interval between the uplink and downlink transmission time slots is smaller than the channel correlated time, the impulse response of the uplink channel and the impulse response of the downlink channel have great correlation, and by using the above characteristics, said technology combines the channel impulse response obtained by uplink joint channel estimation and the user spread spectrum sequence information to pre-process the transmission signals on the side of base station, there is no need to perform channel estimation at the mobile station receiving end, but only to perform related calculations to detect the transmitted signal. Hence, the request for UE joint detection can be converted to the request for base station joint transmission, and complexity of the mobile station is greatly reduced. China patent "A joint optimization signal method based on joint detection and transmission technology" with application number of 03137628.2 makes use of the above technology as the basis. However, there is no realization solution of using joint transmission technology on UE so far.

SUMMARY OF THE INVENTION

The technology problem needs to be solved in the present invention is to propose an establishment method of uplink synchronization based on the joint transmission technology, enabling base stations in TDD mobile communication system of uplink synchronization and quasi-synchronization to precisely instruct UE to complete establishment process of uplink synchronization.

In order to solve the above technical problem, the present invention provides an establishment method of uplink synchronization based on the joint transmission technology to be applied in the mobile communication system, wherein it comprises following steps of:

(a) UE performs channel estimation for the downlink channel which is close to the uplink channel;

(b) UE determines the transmission timing for the transmitted signals of the uplink synchronous time slot;

(c) based on the estimation result of the downlink channel, UE constructs the transmission matrix A as well as the matrix d that is related to the signals originally intended to be sent;

(d) UE solves d=Ae+n, obtaining the converted signal e, wherein n is the noise matrix;

(e) UE uses the converted signal e to replace the original uplink synchronous sequence for transmission, and UE employs the transmission timing determined by step (b) when transmitting;

(f) the base station estimates the received signals by correlator, obtaining the timing of uplink signals and deducing the time adjustments required to be performed by the UE to achieve uplink synchronization;

(g) the network instructs UE to complete the adjustments for the transmission timing of uplink signals based on the obtained information, and UE adjusts the transmission timing for the uplink signal, the establishment of uplink synchronization is completed.

Additionally, the above method also possesses the following characteristic: in said step (a), UE performs channel estimation for the downlink pilot time slot or primary common control physical channel.

Additionally, the above method also possesses the following characteristic: in said step (a), when UE is processing channel estimation, it uses the long-term filtering result of channel estimation to obtain the path location, while at the same time it uses the instantaneous channel estimation result to obtain the channel estimation value of the related path.

Additionally, the above method also possesses the following characteristic: in said step (b), the distance to the base station is estimated according to the power of received signals and then the transmission timing is calculated; or alternatively, UE is assumed to locate at a certain place in the network, and the transmission timing is designated based on the receiving timing.

Additionally, the above method also possesses the following characteristic: said transmission matrix A is constructed with the convolution of spread spectrum sequence and channel estimation result. Said matrix d is composed of signals that are intended to be transmitted and the elements "zero".

Additionally, the above method also possesses the following characteristic: said communication system is a TD-SCDMA system, and it records the channel estimation result in step (a) as H=[$h_1, h_2, \ldots h_{16N}$], wherein N is the over sampling rate and is an integer larger than or equal to one, and $H^T$ matrix is defined as the transpose matrix of H, then in said step (c), the transmission matrix A can be constructed through the following steps of:

(c1) constructing matrix B first according to the following method: a new matrix of 31N*16 is constructed, wherein the first $H^T$ matrix is placed between the first column in the first row and the first column in the $16^{th}$ row within the newly constructed matrix; the next $H^T$ matrix is placed closely to the right of last $H^T$ matrix and the starting row is always added by one. After arranging sixteen $H^T$ matrixes, other elements in the newly constructed matrix of 31N*16 are filled with zeroes;

(c2) then constructing a new matrix of 143N*128, wherein the first B matrix is placed between the first column in the first row and the 16th column in the $31^{st}$ row within the newly constructed matrix; the next B matrix is placed closely to the right of last B matrix and the starting row is always added by 16. After arranging eight B matrixes, other elements in the newly constructed matrix of 143N*128 are filled with zeroes.

Additionally, the above method also possesses the following characteristic: in said step (c), said matrix d is a one-dimension matrix containing 143N elements constructed by adding several zeroes after the uplink synchronous sequence which is originally intended to be sent.

Additionally, the above method also possesses the following characteristic: said noise matrix is the local noise detected by UE, or alternatively, it is obtained by estimating the SNR (signal noise ratio) of uplink pilot time slot at the base station side.

Additionally, the above method also possesses the following characteristic: in said step (d), the Minimum Mean Square Error-Block Linear Equalizer (MMSE-BLE) method, its simplified algorithm, or Zero Forcing-Block Linear Equalizer (ZF-BLE) will be used to solve the signal e.

Additionally, the above method also possesses the following characteristic: in said step (f), the moment of the largest related energy output is used as the timing of uplink signal.

Additionally, the above method also possesses the following characteristic: in said step (f), said base station also determines whether there is another peak value that is smaller than the largest peak value and the difference between them is smaller than a set range. If there is, it can be considered that there are two users using the same accessing code to access, then the flow directly exits; otherwise, step (g) is executed again.

Another technical problem that needs to be solved in the present invention is to propose a transmission matrix in TD-SCDMA system and a generation method thereof, so as to enable said transmission matrix to eliminate the channel delay characteristics after the conversion of uplink synchronous sequence.

In order to solve the above technology problem, the present invention provides a generation method of the transmission matrix in the TD-SCDMA system, wherein it comprises following steps:

(r) based on the channel estimation result H=[$h_1, h_2, \ldots h_{16N}$], obtaining its transpose matrix $H^T$, wherein N is the over sampling rate and it is an integer larger than or equal to one;

(s) constructing matrix B first according to the following method: a new matrix of 31N*16 is constructed, wherein the first $H^T$ matrix is placed between the first column in the first row and the first column in the $16^{th}$ row within the newly constructed matrix; the next $H^T$ matrix is placed closely to the right of last $H^T$ matrix and the starting row is always added by one. After arranging sixteen $H^T$ matrixes, other elements in the newly constructed matrix of 31N*16 are filled with zeroes;

(t) then constructing a new matrix of 143N*128, wherein the first B matrix is placed between the first column in the first row and the 16th column in the $31^{st}$ row within the newly constructed matrix; the next B matrix is placed closely to the right of last B matrix and the starting row is always added by 16. After arranging eight B matrixes, other elements in the newly constructed matrix of 143N*128 are filled with zeroes, now said transmission matrix is obtained.

In order to solve the above technology problem, the present invention also provides a transmission matrix in the TD-SCDMA system, wherein it has following characteristics:

said transmission matrix is a 143N*128-dimension matrix including eight matrixes B, the first B matrix is placed between the first column in the first row and the 16th column in the 31$^{st}$ row within the newly constructed matrix, the next B matrix is placed closely to the right of last B matrix and the starting row is always added by 16, and other elements are zeroes;

said B matrix is a 31N*16-dimension matrix including sixteen H$^T$ matrixes, the first H$^T$ matrix is placed between the first column in the first row and the first column in the 16$^{th}$ row within the newly constructed matrix, the next H$^T$ matrix is placed closely to the right of last H$^T$ matrix and the starting row is always added by one, and other elements are zeroes;

said matrix H$^T$ is a transpose matrix of matrix H, which is a one-dimension matrix constructed by channel estimation result, H=[$h_1, h_2, \ldots h_{16N}$], wherein N is the over sampling rate and it is an integer bigger than or equal to one.

It can be seen from above that by employing the joint transmission technology to convert the uplink synchronous sequence on UE, the present invention eliminates the channel delay characteristics, therefore it can more accurately compute the initial signal timing and obtain a more accurate time adjustment; what's more, it can precisely instruct UE to complete the establishment process of uplink synchronization. Therefore the present invention has fundamentally solved the problem of low probability of success in uplink synchronization establishment.

PREFERRED EMBODIMENTS

TDD mobile communication system is based on TDD, in other words, the downlink and the uplink use the same frequency, and therefore the downlink and the uplink are with the same wireless transmission environment. On the other hand, the channel impulse responses are with correlation within a certain time range, as a result, the channel impulse response of uplink and the channel impulse response of downlink have correlation within a certain time range and can be considered as equal.

The present invention utilizes channel symmetry and channel time correlation of the downlink and the uplink in TDD mobile communication system, and then it proposes the joint transmission technology that can be applied in UE. Moreover, it applies this technology in the uplink synchronization establishment process in a TDD mobile communication system, and based on the simple processing performed by UE, the base station can accurately detect the timing of uplink signals by performing related calculations. The specific embodiment of present invention in TD-SCDMA system will be described with reference to the drawings in order to further describe the technical features and functional specialties of the present invention, however, it is not intended to limit the protection scope of the present invention. In reality, both TD-SCDMA system and WCDMA system can employ the same method.

Figure 1:
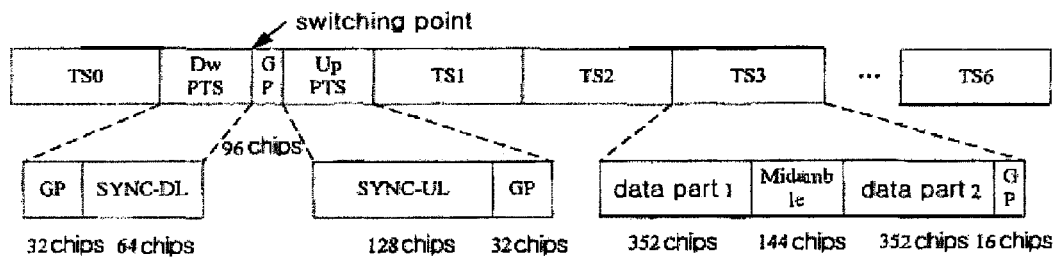
FIG. 1 is a schematic diagram of the sub-frame in a TD-SCDMA system.
Figure 2:
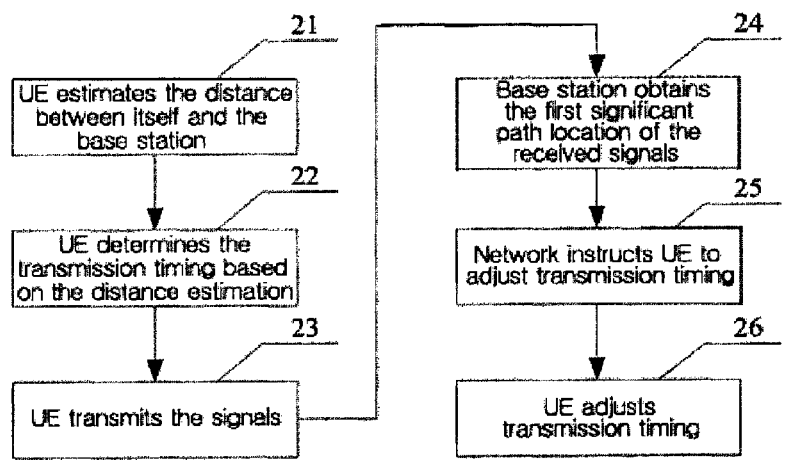
FIG. 2 is a flowchart of the establishment of the prior uplink synchronization.

In the sub-frame structure of TD-SCDMA system in FIG. 1, the longest time interval between the Midamble of time slot 0 and time slot UpPTS is less than one time slot, furthermore the longest time interval between DwPTS and the time slot UpPTS is less than half of one time slot, therefore it can be considered that the channel impulse response of uplink UpPTS is equal to the channel impulse response of downlink time slot 0 or downlink DwPTS. What's more, both the broadcast channel of time slot 0 and the DwPTS part utilize fixed power for consecutive transmission. On UE side, both the signals are with high SNR and their channel estimation results are with high accuracy. In realization, a choice can be made based on the processing capability of UE. If UE has a high processing capability, then a DwPTS part can be chosen for channel estimation.

Figure 3:
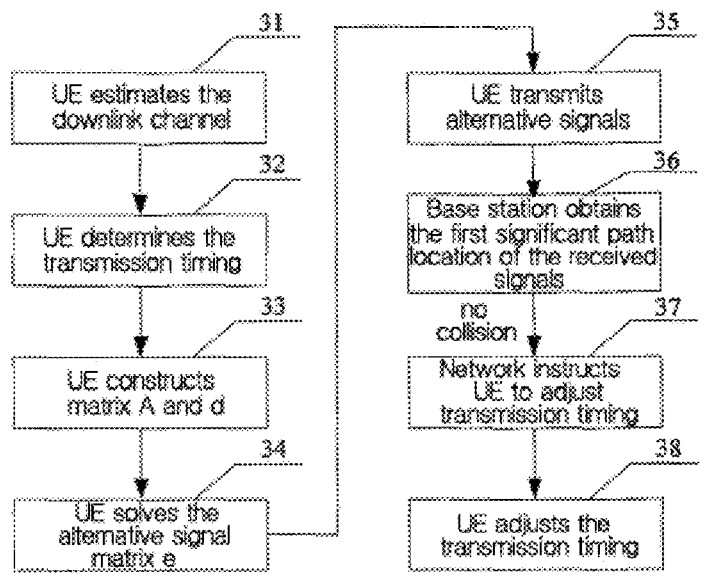
FIG. 3 is a flowchart of the establishment method for uplink synchronization that is proposed in the embodiment of present invention.

As is shown in FIG. 3, the method of present embodiment comprises the following steps:

Step 31, UE performs channel estimation for DwPTS or P-CCPCH (primary common control physical channel);

In the channel estimation process, the present embodiment uses the long-term filtering result of channel estimation to accurately obtain the path location, and at the same time it uses the instantaneous channel estimation result to obtain the channel estimation value of the related path, thereby improves the accuracy of channel estimation. But it can also use other channel estimation methods. Here, the channel estimation result with a over sampling rate of one is recorded as H=[$h_1, h_2, \ldots h_{16}$].

Step 32, UE determines the transmission timing of the transmission signals for uplink synchronization time slot;

Based on the power of the received signals, UE can estimate the distance to the base station and then computes the transmission timing; it also can be assumed that UE is at a certain location in the network, thereby using the set transmission timing. For example: assuming that UE is on the edge of the cell, the transmission timing can be set to be 96 chips prior to the receiving timing. Other methods can be used as well.

Figure 4:
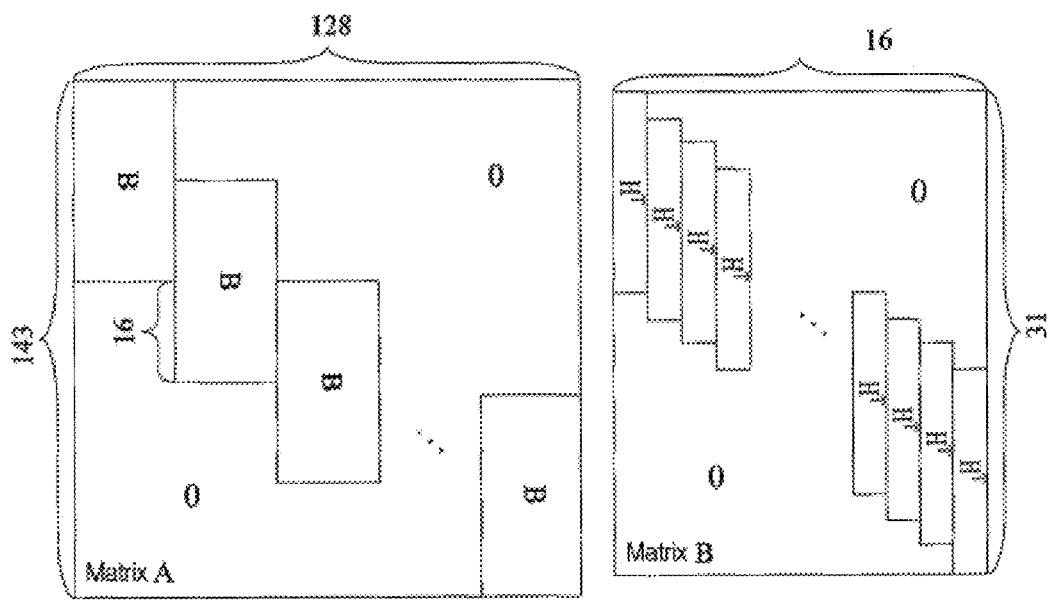
FIG. 4 is a schematic diagram of the transmission matrix A that is proposed in the embodiment of present invention.

Step 33, based on the downlink estimation result, UE constructs a 143*128-dimension transmission matrix A constructed with the convolution of spread spectrum sequence and channel estimation result. Meanwhile, it needs to construct a 1*143-dimension matrix d consisted of signals that will be transmitted and the elements "zero";

Since the joint transmission technology in the present embodiment is used in the synchronous access channel, which is different from other service channels, therefore the constructed matrix A has its own characteristics. As shown in FIG. 4, Matrix A is constructed from eight parallel matrixes B, while matrix B is also constructed by sixteen parallel matrixes H$^T$, wherein H$^T$ is the 16*1-dimension matrix represented by the channel estimation result.

The construction method for matrix B is as follows: a new matrix of 31N*16 is constructed, wherein the first H$^T$ matrix is placed between the first column in the first row and the first column in the 16$^{th}$ row within the newly constructed matrix, the next H$^T$ matrix is placed closely to the right of last H$^T$ matrix and the starting row is always added by one, and after arranging sixteen H$^T$ matrixes, other elements in the newly constructed matrix of 31N*16 are filled with zeroes.

The construction method for matrix A is as follows: a new matrix of 143N*128 is constructed, wherein the first B matrix is placed between the first column in the first row and the 16th column in the 31st row within the newly constructed matrix, the next B matrix is placed closely to the right of the last B matrix and the starting row is always added by 16, and after arranging eight B matrixes, other elements in the newly constructed matrix of 143N*128 are filled with zeroes.

If the uplink synchronous sequence that will be transmitted by UE is $S=[s_1, s_2 \ldots s_{128}]$, then the matrix is $d=[S, 15\times\{0\}]^T$, namely fifteen zeroes are added after the uplink synchronous sequence that is originally intended to be transmitted to form a one-dimension matrix with 143 elements.

Step 34, UE solves d=Ae+n, obtaining the alternative signal e, wherein $e=[e_1, e_2 \ldots e_{128}]^T$; n is the noise matrix, wherein $n=[n_1, n_2 \ldots n_{143}]^T$ and it can be the local noise detected by UE as well as obtained by estimating the SNR of the UpPTS part at the side of base station;

In practice, UE can use MMSE-BLE, ZF-BLE methods and so on in the joint detection technology to solve the signal e. When employing MMSE-BLE method, the general computation formula is as follows:

$$\hat{e}_{c,MMSE\text{-}BLE}=(A^{*T}R_n^{-1}A+R_e^{-1})^{-1}A^{*T}R_n^{-1}d|_{R_e=I} \quad (1)$$

In the formula, $A^{*T}$ represents the transpose matrix of the conjugate matrix of A; $\hat{e}_{c,MMSE\text{-}BLE}$ represents the real transmission signal e; $R_n$ is nominally named as noise space correlation matrix; $R_e$ is nominally named as signal space correlation matrix; $R_n^{-1}$ is the inverse matrix of $R_n$; $|_{R_e=I}$ represents that it is under the condition of $R_e=I$. In the practical solutions, the flow is exactly the same as the flow of the joint detection algorithm. It can also use Cholesky decomposition algorithm, approximate decomposition algorithm, as well as FFT, Schur algorithms, etc.

In order to avoid the reciprocal operation for $R_n$, it can also use the simplified algorithm of the MMSE-BLE method, the formula is as follows:

$$\hat{e}_{c,MMSE\text{-}BLE}=(A^{*T}A+\sigma^2 I)^{-1}A^{*T}d|_{R_e=I} \quad (2)$$

wherein, $\sigma_2$ represents the middle-energy value of the noise.

Alternatively, it can also use a more simplified method, the formula is shown as follows:

$$\hat{e}_{c,MMSE\text{-}BLE}=(A^{*T}A)^{-1}A^{*T}d \quad (3)$$

The performance is relatively better by using formula (1) in finding solutions, but the computation is relatively complicated; the computation is easy when using formula (3) but the performance will be relatively worse; with formula (2), the performance and the computation quantity will be somewhere in between those of the two formulas above.

Step 35, the UE utilizes the alternative signal e to replace the original uplink synchronous sequence for transmission, and its transmission timing can utilize the result from step 32;

Step 36, the base station estimates the received signal by correlator, and sets the moment of the largest energy output as the timing for uplink signals, therefore deducts the time adjustments which is to be performed by UE to reach uplink synchronization;

In practice, UE can also use the supplementary method of FFT. If it is discovered that in the searching window, there exists another peak value that is smaller than the largest peak value and the difference between them is smaller than x dB (x can be set between 0-20 dB). It can be believed that there are two users using the same access code to access, then the flow directly exits; otherwise, step 37 is executed.

Step 37, based on the obtained information, the network instructs UE to finish the uplink signal transmission timing adjustment. In a TD-SCDMA system, this information is transmitted through the specific field in FPACH channel.

Step 38, UE adjusts the transmission timing of the uplink signals based on the orders from network. At this time, the uplink signal can obtain the uplink synchronization at the side of base station.

This communication process can further enter the tracking phase of uplink synchronization.

In conclusion, by employing the joint transmission technology to convert the uplink synchronous sequence on UE, the method of present invention eliminates the channel delay characteristics. Therefore it can more accurately compute the initial signal timing and obtain a more accurate time adjustment. What's more, it can precisely instruct UE to complete the establishment process of uplink synchronization. The present invention has fundamentally solved the problem of low probability of success in uplink synchronization establishment.

It needs to emphasize that the method used in the present invention is not limited in TD-SCDMA system. In other two embodiments, the method is respectively applied in TD-CDMA or WCDMA system, and uses the same flow in FIG. 3, the only difference lies in the constructed matrix A and d, whose construction method is displayed in other patents and papers. For example, the China Patent with the application number 03137628.2 and titled "A method of joint optimization for signals based on the joint detection and joint transmission technologies" discloses a construction method for matrix A and d in TD-SCDMA and WCDMA systems. However, the uplink access of TD-SCDMA system uses a special time slot structure and as a result, it proposes a generation method for the transmission matrix A of TD-SCDMA uplink accessing time slot in said embodiment of the present invention.

In TD-SCDMA system, the dimension of matrix A and B is determined by the width of the sequence that is intended to transmit and the window length of channel estimation. Besides, its dimension will change according to the value of the over sampling rate. In another embodiment, when the over sampling rate is equal to N and $H=[h_1, h_2 \ldots h_{16N}]$, as a result, the construction methods for matrix B and A are the same, but the dimension becomes larger; for example, the B matrix is of 31N*16, while A matrix is of 143N*128, wherein N is an positive integer bigger than or equal to one. The dimension changes due to the over sampling rate can be considered as the same changes in the above example.

Industry Applicability

The method in the present invention can be used in TD-SCDMA, TD-CDMA or WCDMA systems, and enable the base stations in such mobile communication systems to precisely instruct UE to finish the establishment process of uplink synchronization. It possesses the industry practicability.

What I claim is:

1. An establishment method of uplink synchronization based on joint transmission technology used in a mobile communication system, comprising the following steps of:
   (a) performing channel estimation for a downlink channel close to an uplink channel by user equipment;
   (b) determining a transmission timing for transmission signals of an uplink synchronous time slot by user equipment;
   (c) constructing a transmission matrix A and a matrix d that is related to signals originally intended to be sent by user equipment based on downlink channel estimation result;
   (d) solving d=Ae+n by user equipment, obtaining a converted signal e, wherein n is a noise matrix;

(e) using the converted signal e to replace an original uplink synchronous sequence for transmission by user equipment, and using the transmission timing determined in step (b) when transmitting;

(f) estimating uplink signals received from the uplink channel through a correlator by a base station, obtaining a timing of uplink signals and deducing time adjustments needed to be performed by user equipment to reach uplink synchronization;

(g) instructing user equipment to complete adjustments for the transmission timing of uplink signals based on time adjustments provided by a network, and adjusting the transmission timing of uplink signals by user equipment, achieving establishment of uplink synchronization.

2. The method in claim 1, wherein in said step (a), user equipment performs channel estimation for a downlink pilot time slot or a primary common control physical channel.

3. The method in claim 1, wherein in said step (a), when performing channel estimation, the user equipment uses a long-term filtering result of channel estimation to obtain location of a path, and at a same time the user equipment uses an instantaneous channel estimation result to obtain channel estimation value of a related path.

4. The method in claim 1, wherein in said step (b), distance to the base station is estimated according to power of received signals and then the transmission timing is calculated; or, assuming that user equipment is at a certain location in a network, the transmission timing is designated based on a receiving timing.

5. The method in claim 1, wherein said transmission matrix A is constructed with convolution of spread spectrum sequence and downlink channel estimation result, and said matrix d is formed by signals that are intended to be transmitted and elements "zero".

6. The method in claim 5, wherein said communication system is a TD-SCDMA system, and the channel estimation result in step (a) is recorded as H=[h1, h2, . . . h16N], wherein N is over sampling rate and N is an integer larger than or equal to one, and an Ht matrix is defined as a transpose matrix of H, then in said step (c), said transmission matrix A can be constructed through following steps of:

(c1) constructing matrix B first according to following method: a new matrix of 3IN*16 is constructed, wherein a first HT matrix is placed between a first column in a first row and a first column in a 16th row within the new matrix of 3 IN*16, a next HT matrix is placed adjacent to the right of a last placed HT matrix and a starting row is always added by one, after arranging sixteen HT matrixes, other elements in the new matrix of 3IN*16 are filled with zeroes;

(c2) then constructing a new matrix of 143N*128, wherein a first B matrix is placed between a first column in a first row and a 16th column in a 31st row within the new matrix of 143N*128, a next B matrix is placed adjacent to the right of a last placed B matrix and a starting row is always added by 16, after arranging eight B matrixes, other elements in the new matrix of 143N*128 are filled with zeroes.

7. The method in claim 1, wherein said communication system is a TD-SCDMA system, and the channel estimation result in step (a) is recorded as H=[h1, h2, . . . h16N], wherein N is over sampling rate and N is an integer larger than or equal to one, and an H matrix is defined as a transpose matrix of H, then in said step (c), said transmission matrix A can be constructed through following steps of:

(c1) constructing matrix B first according to following method: a new matrix of 3IN*16 is constructed, wherein a first HT matrix is placed between a first column in a first row and a first column in a 16th row within the new matrix of 3 IN*16, a next HT matrix is placed adjacent to the right of a last placed HT matrix and a starting row is always added by one, after arranging sixteen HT matrixes, other elements in the new matrix of 3 IN*16 are filled with zeroes;

(c2) then constructing a new matrix of 143N*128, wherein a first B matrix is placed between a first column in a first row and a 16th column in a 31st row within the new matrix of 143N*128, a next B matrix is placed adjacent to the right of a last placed B matrix and a starting row is always added by 16, after arranging eight B matrixes, other elements in the new matrix of 143N*128 are filled with zeroes.

8. The method in claim 7, wherein in said step (c), said matrix d is a one-dimension matrix containing 143N elements which is constructed by adding several zeros after an uplink synchronous sequence originally intended to be transmitted.

9. The method in claim 1, wherein said noise matrix is a local noise detected by user equipment, or, said noise matrix is obtained by estimating SNR (signal noise ratio) of an uplink pilot time slot at a base station side.

10. The method in claim 1, wherein in said step (d), a Minimum Mean Square Error-Block Linear Equalizer (MMSE-BLE), a simplified algorithm of the MMSE-BLE, or a Zero Forcing Block Linear Equalizer (ZF-BLE) will be used to solve the converted signal e.

11. The method in claim 1, wherein in said step (f), a moment of a largest related energy output is used as a timing of uplink signals.

12. The method in claim 1, wherein in said step (f), said base station also determines whether there is another peak value within a searching window, the another peak value is smaller than a largest peak value and a difference between the another peak value and the largest peak value is smaller than a set range, if there is, said base station can be considered that there are two users using a same accessing code to access, then exiting the establishment method of uplink synchronization; otherwise, executing step (g) again.

* * * * *

UNITED STATES PATENT AND TRADEMARK OFFICE
CERTIFICATE OF CORRECTION

PATENT NO. : 8,300,574 B2
APPLICATION NO. : 11/916482
DATED : October 30, 2012
INVENTOR(S) : Meiling Ding It is certified that error appears in the above-identified patent and that said Letters Patent is hereby corrected as shown below:

In the Specifications

At column 3, line 15: after the word "matrix", the letter --$A$-- should be italicized;

At column 3, line 16: before the word "that", the letter --$d$-- should be italicized;

At column 3, line 17: after the word "solves", the phrase --$d=Ae+n$-- should be italicized;

At column 3, line 19: after the word "signal", the letter --$e$-- should be italicized;

At column 3, line 50: after the word "matrix", the letter --$A$-- should be italicized;

At column 3, line 52: after the word "matrix", the letter --$d$-- should be italicized;

At column 3, line 57: after the word "as", please italicize and correct the phrase to read as --$H=[h1,h2,...h16N]$--;

At column 3, line 60: after the word "matrix", the letter --$A$-- should be italicized;

At column 4, line 26: after the word "signal", the letter --$e$-- should be italicized;

At column 4, line 49: after the word "result", please italicize and correct the phrase to read as --$H=[h1,h2,...h16N]$--;

At column 5, line 19: after the word "result", please italicize and correct the phrase to read as --$H=[h1,h2,...h16N]$--;

At column 6, line 30: please italicize and correct the phrase at the beginning of the line to read as --$H=[h1,h2,...h16N]$--;

Signed and Sealed this
Thirtieth Day of April, 2013

Teresa Stanek Rea
*Acting Director of the United States Patent and Trademark Office*

CERTIFICATE OF CORRECTION (continued)

At column 7, line 5: after the word "is", first instance, please italicize and correct the phrase to read as --$S=[s1,s2,...s128]$--;

At column 7, line 5: after the word "is", second instance, please italicize and correct the phrase to read as --$d=[S, 15\times\{0\}]T$--;

At column 7, line 9: after the word "solves", the phrase --$d=Ae+n$-- should be italicized;

At column 7, line 10: after the word "signal", the letter --$e$-- should be italicized;

At column 7, line 10: after the word "wherein", please italicize and correct the phrase to read as --$e=[e1,e2,...e128]T$--;

At column 7, line 10: after the "," second instance thereof, the letter --$n$-- should be italicized;

At column 7, line 11: after the word "wherein", please italicize and correct the phrase to read as --$n=[n1,n2,...n143]T$--;

At column 7, line 22: after the word "of", the letter --$A$-- should be italicized;

At column 7, line 23: after the word "signal", please italicize and correct the phrase to read as --$e; Rn$--;

At column 7, line 24: after the ",", the letter --$R$-- should be italicized;

At column 7, line 25: after the ";", the letter --$R$-- should be italicized;

At column 7, line 25: after the word "of", the letter --$R$-- should be italicized;

At column 7, line 26: after the word "of", please italicize and correct the phrase to read as --$Re=I$--;

At column 8, line 22: after the word "matrix", the letter --$A$-- should be italicized;

At column 8, line 23: after the word "and", the letter --$d$-- should be italicized;

At column 8, line 39: after the word "and", please italicize and correct the phrase to read as --$H=[h1,h2,...h16N]$--;

In the Claims

At column 8, line 63: after the word "matrix", first occurrence, the letter --$A$-- should be italicized;

At column 8, line 63: after the word "matrix", second occurrence, the letter --$d$-- should be italicized;

At column 8, line 66: after the word "solving", the phrase --$d=Ae+n$-- should be italicized;

CERTIFICATE OF CORRECTION (continued)
U.S. Pat. No. 8,300,574 B2

At column 8, line 67: after the word "signal", the letter --$e$-- should be italicized;

At column 8, line 67: after the word "wherein", the letter --$n$-- should be italicized;

At column 9, line 1: after the word "signal", the letter --$e$-- should be italicized;

At column 9, line 32: before the word "is", the letter --$A$-- should be italicized;

At column 9, line 34: after the word "matrix", the letter --$d$-- should be italicized;

At column 9, line 38: after the word "as", please italicize and correct the phrase to read as --H=[h1,h2,...h16N]--;

At column 9, line 40: after the word "an", "Ht" should read as --$H^T$--;

At column 9, line 41: after the word "matrix", the letter --$A$-- should be italicized;

At column 9, line 44: after the words "matrix of", "3IN*16" should read as --31N*16--;

At column 9, line 45: after the word "first", "HT" should read as --$H^T$--;

At column 9, line 47: after the words "matrix of", "3 IN*16" should read as --31N*16--;

At column 9, line 47: after the word "next", "HT" should read as --$H^T$--;

At column 9, line 48: after the word "placed", "HT" should read as --$H^T$--;

At column 9, line 49: after the word "sixteen", "HT" should read as --$H^T$--;

At column 9, line 50: after the words "matrix of", "3IN*16" should read as --31N*16--;

At column 10, line 7: after the word "as", please italicize and correct the phrase to read as --H=[h1,h2,...h16N]--;

At column 10, line 9: after the word "an", first occurrence, "H" should read as --$H^T$--;

At column 10, line 10: after the word "matrix", the letter --$A$-- should be italicized;

At column 10, line 13: after the words "matrix of", "3IN*16" should read as --31N*16--;

At column 10, line 16: after the words "matrix of", "3IN*16" should read as --31N*16--;

At column 10, line 16: after the word "next", "HT" should read as --$H^T$--;

At column 10, line 17: after the word "placed", "HT" should read as --$H^T$--;

CERTIFICATE OF CORRECTION (continued)
U.S. Pat. No. 8,300,574 B2

At column 10, line 18: after the word "sixteen", "HT" should read as --$H^T$--;

At column 10, line 19: after the words "matrix of", "3 IN*16" should read as --31N*16--;

At column 10, line 30: after the word "matrix", the letter --d-- should be italicized;

At column 10, line 41: after the word "signal", the letter --e-- should be italicized; and At column 10, line 53: after the words "step (g)", please delete the word "again".